(12) United States Patent
Quail et al.

(10) Patent No.: US 6,804,595 B1
(45) Date of Patent: Oct. 12, 2004

(54) CONTROLLER FOR OCCUPANT RESTRAINT SYSTEM

(75) Inventors: Alanna Marie Quail, Okland Township, MI (US); Emmanuel Garcia, Sterling Hghts., MI (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 220 days.

(21) Appl. No.: 09/654,417

(22) Filed: Sep. 1, 2000

Related U.S. Application Data

(60) Provisional application No. 60/152,418, filed on Sep. 3, 1999.

(51) Int. Cl.[7] .................................................. B60Q 1/00
(52) U.S. Cl. ......................... 701/45; 280/735; 180/237; 340/562
(58) Field of Search ............................ 340/903, 870.37, 340/428, 562, 436, 438; 701/45, 46; 280/735, 734, 730, 729, 728.1, 730.1, 802; 180/237, 271, 273, 282, 268, 270, 272

(56) References Cited

U.S. PATENT DOCUMENTS

| | | | |
|---|---|---|---|
| 3,691,400 A | | 9/1972 | Askew |
| 3,794,983 A | | 2/1974 | Sahin |
| 5,046,019 A | | 9/1991 | Basehore |
| 5,232,243 A | | 8/1993 | Blackburn |
| 5,413,378 A | | 5/1995 | Steffens |
| 5,454,591 A | | 10/1995 | Mazur |
| 5,468,013 A | * | 11/1995 | Gille ........................... 280/729 |
| 5,626,359 A | | 5/1997 | Steffens |
| 5,671,332 A | | 9/1997 | Viot |
| 5,673,365 A | | 9/1997 | Basehore et al. |

(List continued on next page.)

FOREIGN PATENT DOCUMENTS

| | | |
|---|---|---|
| DE | 19753163 A | 6/1999 |
| WO | WO 98/17508 | 4/1998 |
| WO | WO 98/54638 A | 12/1998 |

OTHER PUBLICATIONS

R. L. Phen, et al.: "Advanced Air Bag Technology Assessment—Final Report", Apr., 1998.

*Primary Examiner*—Thomas G. Black
*Assistant Examiner*—Tuan C To

(57) ABSTRACT

A vehicle occupant restraint system includes an airbag system and a seat belt harness with pretensioner and retractor mechanisms. Multiple sensors are mounted within the vehicle to measure and monitor various occupant and vehicle characteristics, which are entered into a central processing unit (CPU). These sensors include an occupant presence sensor for determining whether there is an occupant present within the airbag deployment area, a child seat sensor for determining whether a child seat is properly installed in the airbag deployment area, and a seat belt usage sensor for determining whether a seat belt is in an engaged position. The occupant presence, child seat, and seat belt usage sensors generate system modifier signals that can disable the airbag system or seat belt mechanisms if certain predetermined conditions are not satisfied. Other sensors include an occupant weight sensor, an occupant proximity sensor for determining occupant position relative to the airbag deployment area, a crash severity sensor, and a pre-crash sensor for providing vehicle speed and orientation characteristics prior to the collision. All of these sensors provide input signals that are received by the CPU. The CPU processes these multiple input signals with a hizzy logic control system to generate multiple output signals for controlling the airbag and seat belt mechanisms. The multiple output signals can include a multi-stage airbag inflation signal, a variable venting signal, a seat belt pretensioner signal, and a seat belt retractor signal.

40 Claims, 5 Drawing Sheets

U.S. PATENT DOCUMENTS

| | | |
|---|---|---|
| 5,680,096 A | 10/1997 | Grasmann |
| 5,732,375 A | 3/1998 | Cashier |
| 5,809,234 A * | 9/1998 | Le Van Suu .............. 395/200.6 |
| 5,821,633 A | 10/1998 | Burke et al. |
| 5,906,393 A | 5/1999 | Mazur |
| 5,974,350 A * | 10/1999 | Davis, Jr. et al. .............. 701/36 |
| 6,000,717 A | 12/1999 | Rayford |
| 6,015,163 A | 1/2000 | Langford |
| 6,070,115 A | 5/2000 | Oestreicher |
| 6,116,639 A * | 9/2000 | Breed et al. ................. 280/735 |
| 6,220,627 B1 * | 4/2001 | Stanley ....................... 280/735 |
| 6,234,520 B1 * | 5/2001 | Breed et al. ................. 280/735 |

* cited by examiner

CONTROLLER FOR OCCUPANT RESTRAINT SYSTEM

RELATED APPLICATION

This application claims priority to provisional application 60/152,418 filed on Sep. 3, 1999.

BACKGROUND OF THE INVENTION

1. Field of the Invention

This invention relates to a unique method and system for optimizing deployment of an occupant restraint system. The occupant restraint system includes a plurality of sensors that provide multiple input signals to a processing unit that has a fuzzy logic control system for processing the multiple input signals to generate multiple output signals that optimize deployment of the occupant restraint system.

2. Related Art

Many vehicles have airbag systems and seat belt mechanisms that are used to restrain occupants within a vehicle under certain deceleration requirements. If the vehicle decelerates suddenly, such as when a collision occurs, occupants will tend to continue to move forward due to inertial effects. An airbag is deployed under these circumstances to decelerate the occupants' impact speed before they contact a vehicle structure, such as a steering wheel or dashboard. Additionally, if the occupant is wearing a seat belt, pretensioner and retractor mechanisms also assist in controlling motion of the occupant during a collision. The deployment of the airbag and the utilization of the seat belt mechanisms decrease the likelihood of serious injury for the occupants.

If vehicle occupants are positioned too close to the airbag or if a child seat is buckled to the seat, it may be desirable to vary the inflation and deflation rates of the airbag or to prohibit deployment of the airbag to prevent injury to the occupant from the impact of the airbag. It may also be desirable to control the seat belt pretensioner and retractor mechanisms to further prevent injury to occupants.

Occupant sensing systems are used to provide information to optimize or suppress deployment of an airbag if an occupant is determined to be too close to the airbag. These systems typically use a single input to a controller to determine whether or not the airbag should be deployed. The input is usually based on measurement of the seat occupant's weight or monitoring of the occupant's position relative to the airbag deployment area. Based on this input, the controller sends an output signal to control airbag inflation or deflation if a collision occurs.

These systems often do not consider other important factors such as child seat usage, seat belt usage, pre-crash vehicle data, crash severity data, braking data, etc. in determining whether or not to deploy the airbag. Further these systems do not utilize multiple outputs to control both the airbag deployment and the seat belt mechanisms to minimize injury to the occupants.

Thus, it is desirable to have an occupant restraint control system that can utilize multiple inputs to provide multiple output signals to optimize deployment of the occupant restraint system including the operation of seat belt pretensioner and retractor mechanisms and the inflation/deflation rates of the airbag. The system should be easy to install and maintain and should also be easily adaptable to any combination of sensors.

SUMMARY OF THE INVENTION

An occupant restraint system includes a plurality of sensors that provide multiple input signals to a processing unit. The processing unit has a fuzzy logic control system that processes the multiple input signals to generate multiple output signals to optimize deployment of the occupant restraint system. The occupant restraint system preferably includes an airbag assembly with an airbag controller for inflating and deflating an airbag and a seat belt assembly having a seat belt pretensioner mechanism and a seat belt retractor mechanism for controlling the movement of an occupant during a collision.

In one disclosed embodiment, the occupant restraint system includes at least one modifier sensor for generating a modifier signal to enable or disable an occupant restraint system, an occupant sensor assembly for generating an occupant signal representing multiple occupant characteristics, and a collision sensor assembly for generating a collision signal representing vehicle collision characteristics. The processing unit receives the input signals including the modifier, occupant, and collision signals and generates at least one output signal based on the input signals that optimizes deployment of the occupant restraint system.

In a preferred embodiment, the at least one modifier sensor can include various combinations of the following sensors: an occupant presence sensor for determining whether an occupant is present within a predetermined area within the vehicle; a child seat sensor for determining whether a child seat is properly positioned within the predetermined area; and a seat belt usage sensor for determining whether a seat belt harness is being utilized by the occupant. The occupant presence sensor generates an occupant signal that is positive when the occupant is in the predetermined area and negative when the occupant is not in the predetermined area. The child seat sensor generates a child seat signal that is positive when the child seat is properly positioned within the predetermined area and negative when the child seat is not present or improperly positioned within the predetermined area. The seat belt usage sensor generates a seat belt signal that is positive when the seat belt harness is in an engaged position and negative when the seat belt harness is in a disengaged position. The modifier signal is compiled from the combination of the occupant presence, child seat, and seat belt signals.

In a further preferred embodiment, the occupant sensor assembly includes a weight sensor for generating a weight signal representing occupant weight and an occupant proximity sensor for generating an occupant proximity signal representing occupant position relative to a deployment area for the occupant restraint system. The occupant signal is compiled from the combination of the weight and proximity signals. Additionally, the collision sensor assembly includes a severity sensor for generating a severity signal representing collision characteristics occurring at the time of or just after collision and a pre-collision sensor for generating a pre-collision signal representing vehicle characteristics occurring just before collision. The collision signal is compiled from the combination of the severity and pre-collision signals.

Thus, the input to the processing unit is comprised of a plurality of input signals including the modifier signal comprised of an occupant presence signal, a child seat signal, and a seat belt usage signal, the occupant signal comprised of an occupant weight signal and an occupant proximity signal, and the collision signal comprised of a collision severity signal and a pre-collision signal. In the preferred embodiment, the at least one output signal is comprised of a plurality of output signals. These output signals can be any of various combinations of the following signals: a multi-stage inflation control signal for controlling the profile of the airbag; a variable venting control signal for controlling deflation speed of the airbag; and a retractor control signal for controlling the retraction force of the seat belt retractor mechanism. Further, the processing unit preferably includes a fuzzy logic control system for optimizing the plurality of output signals based on the plurality of input signals.

A method for controlling an occupant restraint system includes the following steps. At least one modifier signal is generated which can enable or disable an occupant restraint system based on satisfaction of a predetermined condition. An occupant signal is generated that represents multiple occupant characteristics and a collision signal is generated that represents vehicle collision characteristics. The modifier, occupant, and collision signals are transmitted as multiple input signals to a processing unit and at least one output signal is generated based on the input signals to optimize deployment of the occupant resraint system.

One advantage of this system is that multiple inputs are used to specifically tailor multiple outputs for controlling the occupant restraint system. All of the inputs are combined and are necessary to produce the required outputs. The application of a fuzzy logic control system to all of these independent and variable inputs produces the proper control signals for the airbag and seat belt restraint systems while optimizing the total system response in real time. As a result, the tailored response of the occupant restraint system will have adapted to vehicle conditions sensed prior to and during the collision.

These and other features of the present invention can be best understood from the following specification and drawings, the following of which is a brief description.

DETAILED DESCRIPTION OF AN EXEMPLARY EMBODIMENT

Figure 1:
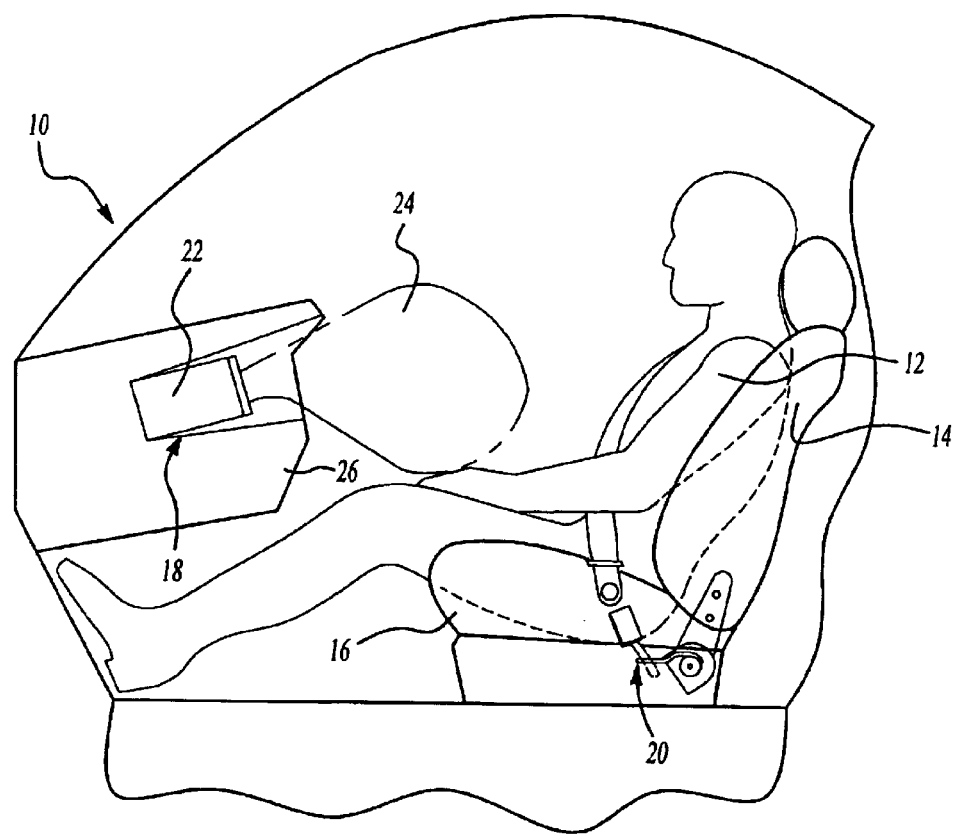
FIG. 1 is an environmental view showing a seat occupant and a restraint system.

A vehicle is shown generally at 10 in FIG. 1 with an occupant 12 seated in a seat having a seat back 14 supported with respect to a seat bottom 16. The vehicle is equipped with an occupant restraint system that includes an airbag system 18 and a seat belt system 20 that are used to restrain occupants 12 within the vehicle 10 under certain predetermined deceleration requirements. If the vehicle decelerates suddenly, such as when a collision occurs, occupants 12 will tend to continue to move forward due to inertial effects. An airbag controller 22 deploys an airbag 24 under predetermined collision circumstances to decelerate the occupants' impact speed before they contact a vehicle structure, such as a steering wheel or dashboard 26.

Figure 2:
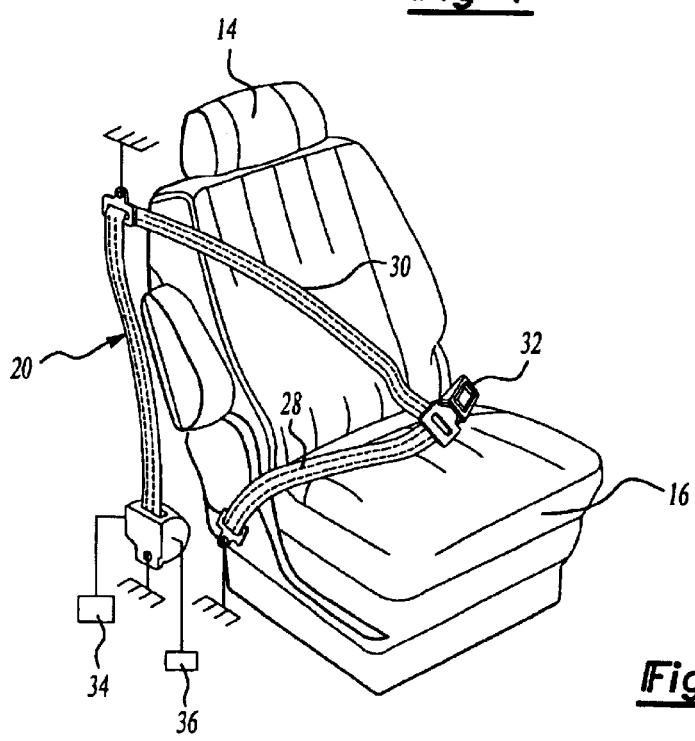
FIG. 2 is a perspective view of a seat with a seat belt system.

The seat belt system 20, shown in FIG. 2, typically includes a lap belt portion 28 and a harness portion 30 that are fastened with a buckle 32 to secure the occupant 12 in the seat. The seat belt system 20 also includes a pretensioner mechanism 34 that provides a predetermined tension force on the occupant 12 via the harness portion 30 when the seat belt 20 is in the engaged position and a retractor mechanism 36 that retracts the harness portion 30 after the harness 30 has been extended. If an occupant 12 is buckled to the seat the pretensioner 34 and retractor 36 mechanisms also assist in controlling motion of the occupant 12 during a collision. The pretensioner 34 and retractor 36 mechanisms are shown schematically in FIG. 2 to indicate that any type of pretensioner 34 or retractor 36 mechanism known in the art can be used. The deployment of the airbag 24 and the utilization of the seat belt mechanisms 34, 36 decrease the likelihood of serious injury for the occupants 12.

Figure 3:
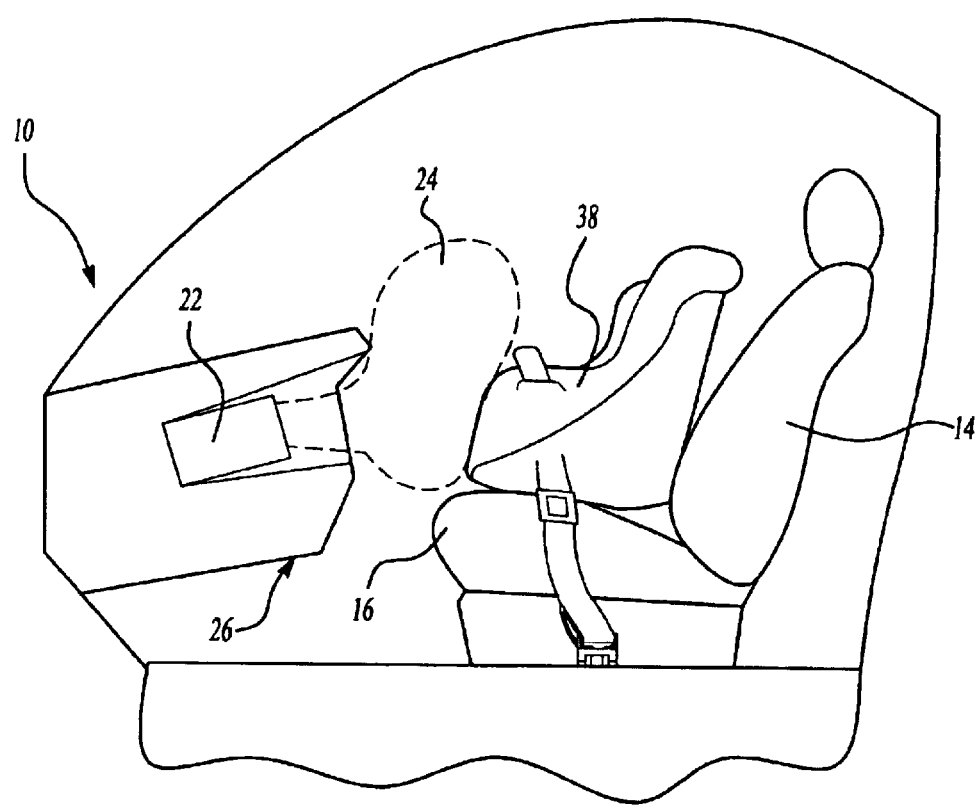
FIG. 3 is a view similar to FIG. 1 but showing a child seat.
Figure 4:
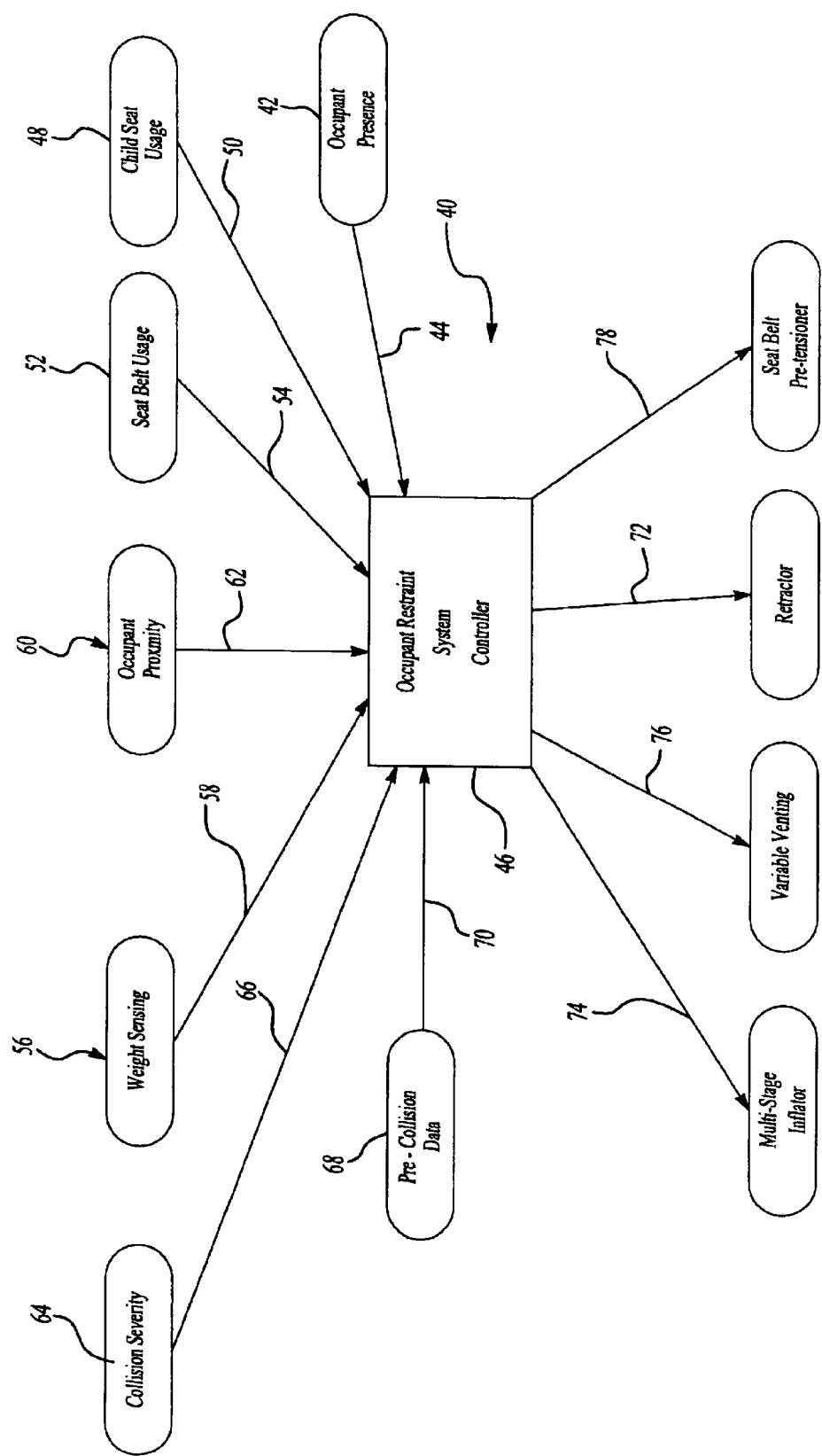
FIG. 4 is a schematic diagram of a control system for the occupant restraint system.

A child seat 38 could also be secured to the seat, shown in FIG. 3. If the child seat 38 is facing rearward or is improperly positioned on the seat the airbag 24 should not be deployed. However, under certain predetermined conditions when the child seat 38 is facing forward as shown in FIG. 3, it may be desirable to deploy the airbag 24 at a lower deployment force to prevent injury to the child.

The subject invention relates to a control system, shown generally at 40, that optimizes deployment of the occupant restraint system. A plurality of sensors are used to provide multiple input signals that are processed by the control system 40 to produce multiple output signals for controlling the airbag inflation/deflation rates and the seat belt mechanism 34, 36. A fuzzy logic control system is preferably used to process the multiple input signals and to generate the multiple output signals to optimize deployment of the occupant restraint system. This will be discussed in greater detail below.

The system includes an occupant presence sensor 42 that determines whether there is an occupant 12 positioned in a predetermined area that will be affected by the occupant restraint system. Any type of sensor 42 could be used including optical, contact, or non-contact type sensors for example. The occupant presence sensor 42 generates an occupant presence signal 44 that is sent to a central processing unit (CPU) or a similar type central controller 46. The occupant presence signal 44 will either be a positive signal indicating that the occupant 12 is in the predetermined area or a negative signal indicating the occupant 12 is not in the predetermined area. It should be understood that the terms "positive" and "negative" do not indicate a mathematical value and are simply descriptive terms to differentiate between two different signal designations, similar to an "on/off" designation, for example. If the occupant 12 is in the predetermined area, additional input signals will be processed, but if the occupant 12 is not in the predetermined area the occupant restraint system will not be activated. Thus, transmission of the negative occupant presence signal to the CPU 46 disables the occupant restraint system and prevents deployment of the airbag 24 and activation of the pretensioner 34 and retractor 36 mechanisms. This prevents unnecessary use of the airbag 24 and decreases replacement costs.

The system also includes a child seat sensor 48 for determining whether a child seat 38 is properly positioned within a predetermined area. Any type of sensor 48 could be used including optical, contact, or non-contact type sensors for example. The child seat sensor 48 generates a child seat signal 50 that is sent to the CPU 46. The child seat signal 50 will either be a positive signal indicating that the child seat 38 is present and is in a properly installed position, i.e., facing forward, or a negative signal indicating the child seat 38 is not in the predetermined area or is improperly positioned, i.e. facing rearward. As discussed above, the terms "positive" and "negative" do not indicate a mathematical value and are simply descriptive terms to differentiate between two different signal designations. If the child seat 38 is properly positioned, additional input signals will be processed, but if the child seat 38 is properly positioned or is not present, the airbag 24 will not be deployed.

The system also includes a seat belt usage sensor 52 for determining whether the occupant 12 is utilizing a seat belt harness 30 and/or lap belt 28. Any type of seat belt usage sensor 52 known in the art could be used including optical, contact, or non-contact type sensors for example. The seat belt usage sensor 52 generates a seat belt usage signal 54 that is sent to the CPU 46. The seat belt usage signal 54 will either be a positive signal indicating that the seat belt 20 is engaged or a negative signal indicating the seat belt 20 is disengaged. As discussed above, the terms "positive" and "negative" do not indicate a mathematical value and are simply descriptive terms to differentiate between two different signal designations. If the seat belt 20 is engaged, additional input signals will be processed. If the seat belt 20 is disengaged additional input signals will be processed but the pretensioner 34 and retractor 36 mechanisms will not be deployed.

The occupant presence 42, child seat 48, and seat belt usage 52 sensors are referred to as modifier sensors because the sensors 42, 48, 52 are on/off type inputs that can enable or disable certain outputs. Thus, the occupant presence 44, child seat 50, and seat belt usage 54 signals are referred to as modifier signals. Any combination of the above referenced modifier sensors and signals can be used as inputs to the CPU 46. Optionally, additional modifier sensors could be used to provide additional input to the CPU 46.

The system also includes a weight sensor 56 that generates a weight signal 58 representing occupant weight. The weight sensor 56 can be any type of weight measuring sensor assembly known in the art and can include of a plurality of sensors, such as strain gages for example, to measure occupant weight. An occupant proximity sensor 60 generates an occupant proximity signal 62 representing occupant position relative to a deployment area for the airbag 24. Any type of proximity sensor 60 can be used including optical, contact, or non-contact type sensors for example. The weight 56 and proximity 60 sensors are referred to as occupant sensors. These sensors 56, 60 generate an occupant signal, comprised of the weight 58 and proximity 62 signals, that is sent to the CPU 46 as input for determining inflation/deflation rates for the airbag 24. Additional occupant sensors and occupant signals could also be used to provide additional input information to the CPU 46.

The system includes a collision sensor assembly with a severity sensor assembly 64 that generates a severity signal 66 representing vehicle collision characteristics occurring at the time of or just after collision. These characteristics can include vehicle speed, position, and/or braking data, for example. The system can optionally include a pre-collision sensor assembly 68 for generating a pre-collision signal 70 representing vehicle characteristics occurring just before collision. These characteristics can include vehicle speed, orientation, and/or braking data, for example. The severity 64 and pre-collision 68 sensor assemblies are preferably comprised of multiple sensors, well known in the art, for measuring and monitoring, vehicle speed, braking force, acceleration, deceleration, etc.

Multiple input signals comprised of any of various combinations of the occupant presence 44, child seat 50, seat belt usage 54, occupant weight 58, occupant proximity 62, severity, and/or pre-collision 70 signals are generated and transmitted to the CPU 46. The CPU 46 receives and processes these input signals and generates multiple output signals that optimize control of the occupant restraint system.

The output signals are comprised of any of various combinations of the following signals. A retractor control signal 72 controls deployment of the seat belt retractor mechanism 36 to reduce forward momentum of the occupant 12. A multi-stage inflation control signal 74 is used to control the inflation profile of the airbag 24. A variable venting control signal 76 is used to control deflation speed of the airbag 24. Another output signal can include a seat belt pretensioner signal 78 that is used to control the tension force on the harness portion 30 of the seat belt 20. Thus, the multiple input signals are processed by the CPU 46, which then generates the multiple output signals including the retractor 72, multi-stage inflation 74, variable venting 76, and/or pretensioner 78 control signals. The CPU 46 utilizes a fuzzy logic control system to optimize the plurality of output signals based on the plurality of input signals to provide optimal deployment of the airbag 24 and seat belt mechanisms 34, 36 based on the type of occupant 12, the position of the occupant 12, the proximity of the occupant 12 to the airbag 24, etc.

Fuzzy logic control systems are well known in the art. The fuzzy logic control system encompasses and expands on Boolean logic. En Boolean logic, events are designated with a "1" or "0" value. Thus, there is only a choice of two different values to describe or designate an event. In a fuzzy logic control system all values between "1" and "0" are used, allowing the choice of multiple values to describe or designate an event. Fuzzy logic control systems also allow classification overlapping, which is strictly forbidden in a Boolean system.

In a control application, the fuzzy logic system preferably includes the following features: membership functions, rules, rule evaluation, and defuzzification. Membership functions equate linguistic names to the values between "0" and "1." The rules include "IF/THEN" statements that use predetermined specifications and data to control the system. Rule evaluation involves the process of combining multiple inputs and applying multiple rules. Based on the input values, one or all of the rules can be used to control the system to some degree. During this step of the process, the rule results are distilled into one fuzzy shape. During the defuzzification step, the result is translated back into a single value that is used to control the airbag and/or seat belt mechanisms.

Figure 5:
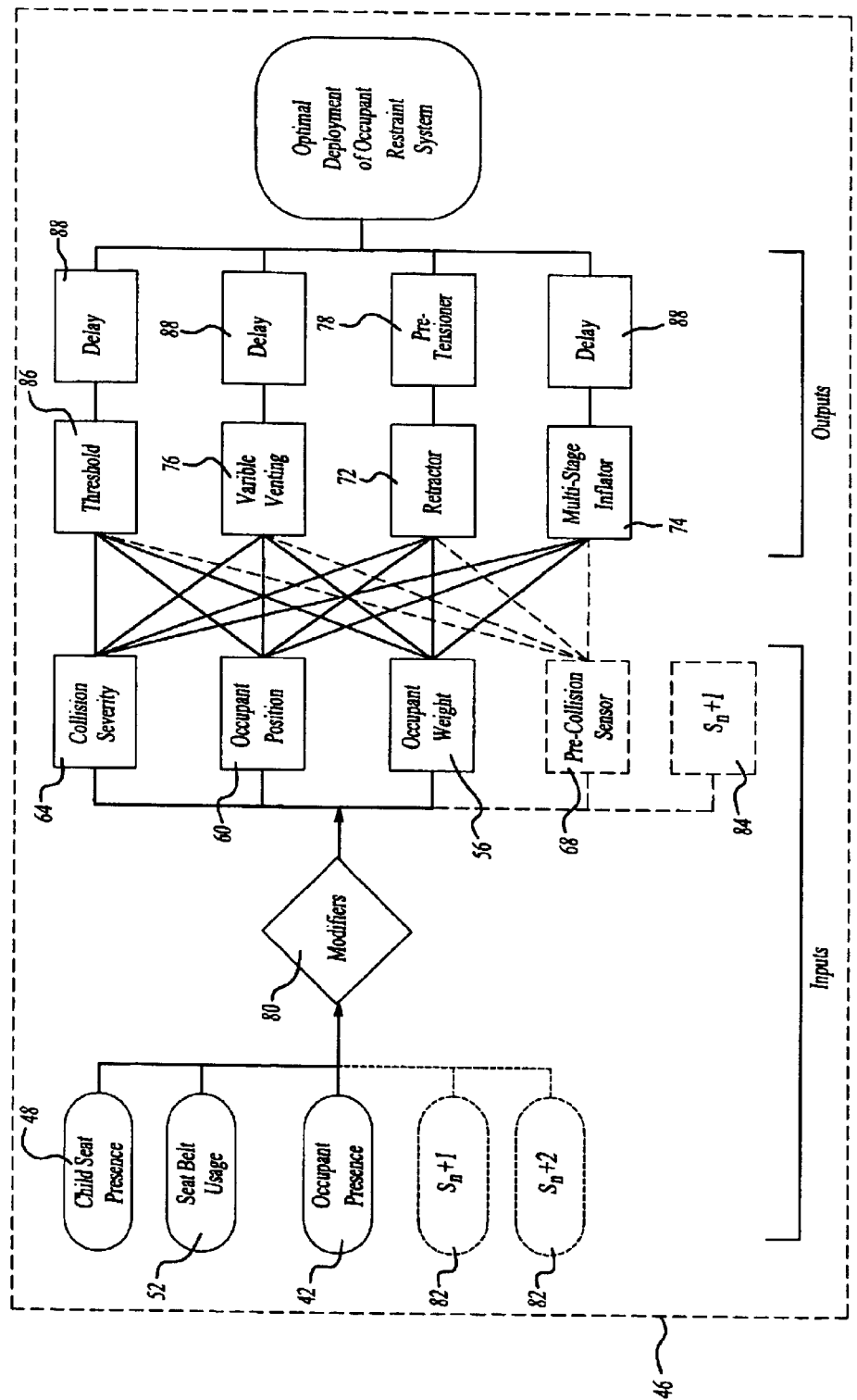
FIG. 5 is a schematic diagram of the multiple input and output signals used for optimal deployment of the occupant restraint system.

By utilizing a fuzzy logic control system, deployment of the airbag 24 and/or seat belt mechanisms 34, 36 can be specifically tailored to different occupants 12 based on size, weight, position, etc. As shown in FIG. 5 and as discussed above, the occupant presence 42, child seat 48, and seat belt usage 52 sensors are referred to as modifiers 80 because these sensors 42, 48, 52 are on/off type inputs that can enable or disable certain outputs. In addition to these modifiers 80, other sensors 82 could be used to provide additional input to the CPU 46.

Once the modifiers 80 are processed, additional inputs are evaluated. The additional input includes the occupant weight sensor 56, the occupant position sensor 60 for generating an occupant position signal indicating the position and/or proximity of the occupant 12 relative to the airbag deployment area, the collision severity sensor 64 for measuring multiple collision characteristics occurring at the time of or just after collision, and the pre-collision sensor 68 for measuring vehicle characteristics occurring just before collision. In addition to these inputs, other sensors 84 could be used to provide additional input to the CPU 46.

Once the CPU 46 processes the variable data from the occupant weight sensor 56, the occupant position sensor 60, the collision severity sensor 64, and the pre-collision sensor 68, the fuzzy logic control system is used to process the information and to generate the optimal output control decision. Each of the variable data inputs, i.e. the non-modifier inputs, has a descriptive membership function that describes ranges over their respective domain. The fuzzy logic process combines all of the inputs and control values for the variable outputs. Preferably the outputs include any combination of the multi-stage inflator signal 74, the retractor force signal 72, the pretensioner signal 78 and/or the variable venting signal 76. Additional output signals cart also be generated such as a threshold signal 86, for example.

The multi-stage inflator signal 74 allows the system to control the airbag's pressure profile. The airbag 24 can be initially inflated from 75% to 100% of the peak pressure. The threshold signal 86 is the first stage of the multi-stage inflator and determines the firing of the first squib. The retractor force signal 72 allows the seat belt 20 to control some of the occupant's forward momentum during the collision, and preferably applies a constant force to provide a smoother transition for the occupant 12. The variable venting signal 76 allows the airbag 24 to deflate at different speeds to control the ridedown of the occupant 12 after airbag deployment. The seat belt pretensioner signal 78 enables the pretensioner 34 via the seat belt usage sensor 52. The other outputs, i.e., the threshold 86, variable venting 76, and multi-stage inflator 74 signals preferably have calculated delays 88, associated within them to let the seat belt pretensioner 34 and retractor 36 mechanisms provide the initial control of the occupant's motion.

Figure 6:
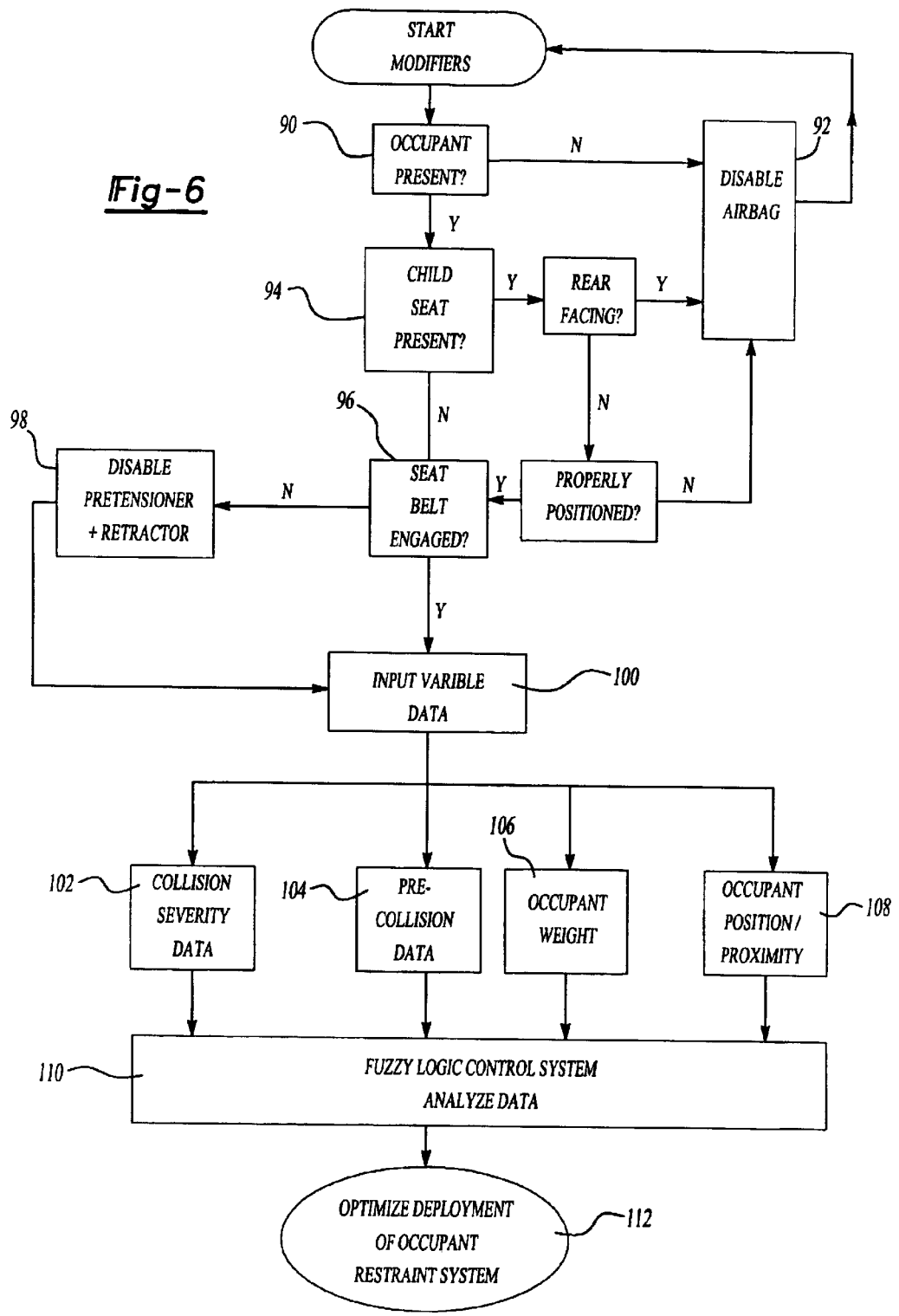
FIG. 6 is a flow chart of the control process for optimizing deployment of the occupant restraint system.

A flow chart of the control process for optimizing deployment of the occupant restraint system is shown in FIG. 6. First the modifiers 80 are processed. The modifiers 80 can be processed in any order. In one embodiment, the first step is determining the occupant presence 90. If the occupant is present, then the next modifier is processed. If the occupant is not present then the airbag 24 is disabled 92. Next, the CPU 46 determines whether there is a child seat 38 present 94. If the child seat 38 is not present, then the next modifier is processed. If the child seat 38 is present, the CPU 46 determines whether the child seat 38 is properly positioned. If the child seat 38 is facing towards the rear of the vehicle or is otherwise determined to be improperly installed, the airbag 24 is disabled 92. If the child seat 38 is forward facing or otherwise determined to be properly positioned, then the next modifier is processed.

Next, the CPU 46 determines whether or not the seat belt 20 is engaged 96. If the seat belt 20 is disengaged, then the pretensioner 34 and retractor 36 mechanisms are disabled 98. If the seat belt 20 is engaged, then any additional modifiers 80 would be processed. Once all of the modifiers 80 are processed, the variable data is processed 100. The variable data includes the collision severity data 102, pre-collision data 104, occupant weight data 106, and occupant position/proximity data 108, plus any other additional variable data. As discussed in detail above, the CPU 46 utilizes a fuzzy logic control system to analyze the data 110 and based on this analysis generates an output signal to optimize deployment of the occupant restraint system 112.

The method for controlling the occupant restraint system includes the following steps. At least one modifier signal is generated to enable or disable an occupant restraint system based on satisfaction of a predetermined condition. For example, the modifier signal can be comprised of a single signal or a plurality of signals comprised of any combination of the following signals: the occupant presence signal 44, the child seat signal 50, or the seat belt usage signal 54. A positive occupant presence signal 44 indicates that the occupant 12 is present in a predetermined area and a negative occupant presence signal 44 indicates that the occupant 12 is not in the predetermined area. A positive child seat signal 50 indicates that the child seat 38 is properly installed within the predetermined area and a negative child seat signal indicates that the child seat 38 is not present or is improperly installed within the predetermined area. A positive seat belt usage signal 54 indicates that the seat belt 20 is in an engaged position and a negative seat belt usage signal 54 indicates that the seat belt 20 is in a disengaged position.

An occupant signal is generated representing multiple occupant characteristics such occupant weight and proximity. A collision signal is generated representing vehicle collision characteristics such as speed, position, and braking, for example. The modifier, occupant and collision signals are transmitted as multiple input signals to the processing unit and at least one output signal is generated based on the input signals to optimize deployment of the occupant restraint system. Additional steps include modifying the output signal to disable the occupant restraint system when either the negative occupant presence signal 44, the negative child seat signal 50, or the negative seat belt 54 usage signal is generated and continuing to process the output signal when either the positive occupant presence signal 44, the positive child seat signal 50, or the positive seat belt usage signal 54 is generated.

The output signal is used to control inflation and deflation of the airbag 24 and to control operation of the pretensioner mechanism 34 and retractor mechanism 36. The output signal can control various functions of the airbag 24 and seat belt 20 systems. A multi-stage inflation control signal 74 for controlling the pressure profile of the airbag 24, a variable venting control signal 76 for controlling deflation speed of the airbag 24, and a retractor control signal 72 for controlling the retraction force of the seat belt retractor mechanism 34 are just some of the output signals that can be generated by the CPU 46.

A fuzzy logic analysis process is used to generate the output signal based on the plurality of input signals. As discussed in detail above, the fuzzy logic analysis process includes the steps of creating membership functions by assigning names to predetermined values within a designated range; designating rules to be applied to the input signals; evaluating the rules and input signals to form an optimal control decision; and translating the optimal control decision into the output signal.

Optionally, the CPU 46 can be programmed with a neural network for learning vehicle characteristics unique to vehicle type. Each vehicle type has different passenger compartment characteristics. For example, sport utility vehicles have larger passenger compartments than compact cars. To incorporate the subject occupant restraint control system into multiple vehicle types without having to re-develop, re-design, and re-program for each vehicle type, further adaptability can be built into the system by using a neural network. The addition of a neural network would create a neuro-fuzzy system that could learn about the specific vehicle type during the developmental stages such as testing. The fuzzy logic analysis process could then be optimized for the specific vehicle type.

Although a preferred embodiment of this invention has been disclosed, it should be understood that a worker of ordinary skill in the art would recognize many modifications come within the scope of this invention. For that reason, the following claims should be studied to determine the true scope and content of this invention.

What is claimed is:

1. An occupant restraint system comprising:

at least one modifier sensor that generates a modifier signal representative of either a positive condition to enable an occupant restraint system having at least an airbag assembly and a seat belt assembly or a negative condition to disable the occupant restraint system, said modifier signal disabling at least one of an airbag control or a seat belt control as soon as at least one negative condition is identified and not disabling said airbag control or said seat belt control if all predetermined conditions are positive conditions;

an occupant sensor assembly that generates an occupant signal representing multiple occupant characteristics;

a collision sensor assembly that generates a collision signal representing vehicle collision characteristics; and a processing unit for receiving input comprised of said modifier, occupant, and collision signals and for generating at least one output signal based on said input that optimizes deployment of said occupant restraint system.

2. A system as set forth in claim 1 wherein said at least one modifier sensor includes an occupant presence sensor for determining whether an occupant is present within a predetermined area within the vehicle and wherein said modifier signal is generated as a positive modifier signal when the occupant is in said predetermined area and generates a negative modifier signal when the occupant is not in said predetermined area.

3. A system as set forth in claim 2 wherein transmission of said negative modifier signal to said processing unit disables said occupant restraint system.

4. A system as set forth in claim 1 wherein said at least one modifier sensor includes a child seat sensor for determining whether a child seat is properly positioned within a predetermined area and wherein said modifier signal is generated as a positive modifier signal when said child seat is properly positioned within said predetermined area and is generated as a negative modifier signal when said child seat is improperly positioned within said predetermined area.

5. A system as set forth in claim 4 wherein transmission of said negative modifier signal to said processing unit disables said occupant restraint system.

6. A system as set forth in claim 1 wherein said at least one modifier sensor includes a seat belt usage sensor for determining whether a set belt harness is being utilized by the occupant and wherein said modifier signal is generated as a positive modifier signal when said seat belt harness is in an engaged position and is generated as negative modifier signal when said seat belt harness is in a disengaged position.

7. A system as set forth in claim 6 wherein said at least one output signal includes a retractor control signal for controlling deployment of a seat belt retractor to reduce forward momentum of the occupant when said processing unit receives a positive modifier signal and for disabling said seat belt retractor when said processing unit receives a negative modifier signal.

8. A system as set forth in claim 1 wherein said at least one modifier sensor is comprised of an occupant presence sensor for determining whether an occupant is present within a predetermined area within the vehicle, a child seat sensor for determining whether a child seat is properly positioned within said predetermined area, and a seat belt usage sensor for determining whether a seat belt harness is being utilized by the occupant and wherein said occupant presence sensor generates an occupant signal that is positive when the occupant is in said predetermined area and negative when the occupant is not in said predetermined area, said child seat sensor generates a child seat signal that is positive when said child seat is properly positioned within said predetermined area and negative when said child seat is improperly positioned within said predetermined area, and said seat belt usage sensor generates a seat belt signal that is positive when said seat belt harness is in an engaged position and negative when said seat belt harness is in a disengaged position, said modifier signal being comprised of said occupant presence, child seat, and seat belt signals.

9. A system as set forth in claim 1 wherein said occupant sensor assembly includes a weight sensor for generating a weight signal representing occupant weight and an occupant proximity sensor for generating an occupant proximity signal representing occupant position relative to a deployment area for said occupant restraint system, said occupant signal being comprised of said weight and proximity signals.

10. A system as set forth in claim 9 wherein said collision sensor assembly includes a severity sensor for generating a severity signal representing collision characteristics occurring at the time of or just after collision and a pre-collision sensor for generating a pre-collision signal representing vehicle characteristics occurring just before collision, said collision signal being comprised of said severity and pre-collision signals.

11. A system as set forth in claim 1 wherein said occupant restraint system includes an airbag assembly with an airbag controller for inflating and deflating an airbag and a seat belt assembly having a seat belt pretensioner mechanism and a seat belt retractor mechanism.

12. A system as set forth in claim 11 wherein said input to said processing unit is comprised of a plurality of input signals including said modifier signal comprised of an occupant presence signal, a child seat signal, and a seat belt usage signal, said occupant signal comprised of an occupant weight signal and an occupant proximity signal, and said collision signal comprised of a collision severity signal and a pre-collision signal.

13. A system as set forth in claim 12 wherein said at least one output signal is comprised of a plurality of output signals including a multi-stage inflation control signal for controlling the profile of said airbag, a variable venting control signal for controlling deflation speed of said airbag, and a retractor control signal for controlling the retraction force of said seat belt retractor mechanism.

14. A system as set forth in claim 13 including a fuzzy logic control system for optimizing said plurality of output signals based on said plurality of input signals.

15. A system as set forth in claim 1 wherein said at least one modifier sensor includes a child seat sensor for identifying all possible installation positions of a child seat including forward and rearward facing positions.

16. A system as set forth in claim 10 wherein said pre-collision signal is generated based on at least vehicle speed and braking characteristics occurring prior to a collision event.

17. A system as set forth in claim 1 wherein said processing unit includes a network capable of learning various vehicle characteristics unique to vehicle type and size and adapting said output signal to account for different vehicle types.

18. A system as set forth in claim 17 wherein said network is capable of learning passenger compartment size.

19. An occupant restraint system comprising:
an airbag assembly with an airbag controller for inflating and deflating an airbag;
a seat belt assembly having a seat belt pretensioner mechanism and a seat belt retractor mechanism;
a plurality of modifier sensors including a occupant presence sensor for generating an occupant presence signal indicating whether an occupant is present in a predetermined area, a child seat sensor for generating a child seat position signal indicating whether a child seat is properly installed within said predetermined area, and a seat belt usage sensor for generating a seat belt signal indicating whether a seat belt is in an engaged or disengaged position;
a plurality of occupant sensors including an occupant weight sensor for generating an occupant weight signal and an occupant position sensor for generating an occupant position signal indicating the position of the occupant relative to an occupant restraint system deployment area;
a plurality of collision sensors including a severity sensor for generating a severity signal indicating collision characteristics occurring at the time of or just after collision and a pre-collision sensor for generating a pre-collision signal indicating vehicle characteristics occurring just before collision; and
a processing unit for receiving multiple input signals comprised of said occupant presence, child seat, seat belt, occupant weight, occupant position, severity, and pre-collision signals and for generating multiple output signals including a multi-stage inflation control signal for controlling the profile of said airbag, a variable venting control signal for controlling deflation speed of said airbag, and a retractor control signal for controlling the retraction force of said seat belt retractor mechanism.

20. A system as set forth in claim 19 wherein said processing unit includes a fuzzy logic control system for optimizing said multiple output signals based on said multiple input signals.

21. A system as set forth in claim 20 wherein said occupant presence signal is either a positive occupant presence signal indicating the occupant is present in said predetermined area or a negative occupant presence signal indicating the occupant is not present in said predetermined area; said child seat signal is either a positive child seat signal indicating said child seat is properly installed within said predetermined area or a negative child seat signal indicating said child seat is improperly installed within said predetermined area; and said seat belt signal is either a positive seat belt signal indicating said seat belt is engaged or a negative seat belt signal indicating said seat belt is disengaged wherein said negative occupant presence and negative child seat signals disables said airbag controller to prevent inflation of said airbag and said negative seat belt signal disables said seat belt pretensioner and retractor mechanisms.

22. A system as set forth in claim 19 wherein said child seat sensor identifies whether said child seat is forward or rearward facing and said child seat position signal is generated based on a combination of forward or rearward identification of said child seat and proper installation of said child seat within said predetermined area.

23. A system as set forth in claim 19 wherein said pre-collision signal is generated based on at least vehicle speed and braking characteristics occurring prior to a collision event.

24. A system as set forth in claim 19 wherein said processing unit is installable within multiple vehicle types having different passenger compartment sizes and includes a network capable of identifying specific passenger compartment sizes upon installation.

25. A method for controlling an occupant restraint system including at least a seat belt assembly and an airbag assembly comprising the steps of:
(a) (1) generating at least one modifier signal that represents either a positive condition to enable the occupant restraint system or a negative condition to disable the occupant restraint system; and
(2) disabling at least one of an airbag control or a seat belt control in response to the modifier signal identifying at least one negative condition and not disabling the airbag control or the if the modifier signal identifies all possible conditions as positive conditions;
(b) after step (a)(2), generating an occupant signal representing multiple occupant characteristics;
(c) generating a collision signal representing vehicle collision characteristics; and
(d) transmitting the modifier, occupant, and collision signals as multiple input signals to a processing unit; and
(e) generating at least one output signal based on the input signals to optimize deployment of the occupant restraint system.

26. A method as set forth in claim 25 wherein the at least one modifier signal comprises a plurality of modifier signals and step (a) includes generating a first modifier signal having either a positive occupant presence signal indicating that an occupant is present in a predetermined area or a negative occupant presence signal indicating that the occupant is not in the predetermined area; generating a second modifier signal having either a positive child seat signal indicating that a child seat is properly installed within the predetermined area or a negative child seat signal indicating that the child seat is not present or is improperly installed within the predetermined area; and generating a third modifier signal having either a positive seat belt usage signal indicating that a seat belt is in an engaged position or a negative seat belt usage signal indicating that the seat belt is in a disengaged position; and wherein step (e) includes the step of modifying the output signal to disable the occupant restraint system when either the negative occupant presence signal; the negative child seat signal, or the negative seat belt usage signal is generated.

27. A method as set forth in claim 26 wherein step (e) includes the step of continuing to process the output signal when either the positive occupant presence signal, the positive child seat signal, or the positive seat belt usage signal is generated.

28. A method as set forth in claim 26 wherein step (e) includes utilizing the output signal to control inflation and deflation of an airbag and to control operation of a seat belt assembly having a seat belt pretensioner mechanism and a seat belt retractor mechanism.

29. A method as set forth in claim 26 wherein step (e) includes generating a plurality of output signals including generating a multi-stage inflation control signal for controlling the profile of the airbag, generating a variable venting control signal for controlling deflation speed of the airbag, and generating a reactor control signal for controlling the retraction force of the seat belt retractor mechanism.

30. A method as set forth in claim 29 including programming the processing unit with a fuzzy logic analysis process to generate the plurality of output signals based on the plurality of input signals before step (e).

31. A method as set forth in claim 30 wherein step (b) includes generating an occupant weight signal and an occupant proximity signal indicating position of the occupant relative to the airbag.

32. A method as set forth in claim 31 wherein step (c) includes generating a severity signal indicating vehicle characteristics at or after collision and generating a pre-collision signal indicating vehicle characteristics before collision.

33. A method as set forth in claim 25 including utilizing a fuzzy logic analysis process to generate the output signal based on the plurality of input signals before step (e) wherein the fuzzy logic analysis process includes the steps of creating membership functions by assigning each non-modifier signal to one of a plurality of predetermined values within a designated range for each function; designating rules to be applied to the input signals and membership functions; evaluating the rules and input signals to form an optimal control decision; and translating the optimal control decision into the output signal.

34. A method as set forth in claim 25 including the step of learning vehicle characteristics unique to vehicle type and size by using a neural network.

35. A method as set forth in claim 25 including the step of generating a child seat position signal as a modifier signal during step (a) to identify installation position of a child seat as being either forward facing or rearward facing with forward facing corresponding to a positive condition and rearward facing corresponding to a negative condition.

36. A method as set forth in claim 26 wherein step (a) is performed prior to step (b).

37. A method as set forth in claim 32 wherein step (c) further includes generating the pre-collision signal based on at least vehicle speed and braking characteristics prior to a collision event.

38. A method as set forth in claim 25 further including the steps of installing a common processing unit in multiple vehicle types having different passenger compartment sizes and identifying a specific passenger compartment size after installation prior to step (a).

39. A method as set forth in claim 38 further including the steps of modifying the output signal based on the specific passenger compartment size.

40. A method as set forth in claim 25 including utilizing a fuzzy logic analysis process to generate the at least one output signal based on the plurality of input signals.

* * * * *